(12) United States Patent
Musmeci

(10) Patent No.: US 8,714,458 B2
(45) Date of Patent: May 6, 2014

(54) HIGH-RELIABILITY PRODUCT/ACTIVITY TRACKING SYSTEM

(75) Inventor: Mario Musmeci, Rome (IT)

(73) Assignee: Telespazio S.p.A., Rome (IT)

( * ) Notice: Subject to any disclaimer, the term of this patent is extended or adjusted under 35 U.S.C. 154(b) by 393 days.

(21) Appl. No.: 13/141,491

(22) PCT Filed: Dec. 23, 2008

(86) PCT No.: PCT/EP2008/068281
§ 371 (c)(1),
(2), (4) Date: Jun. 22, 2011

(87) PCT Pub. No.: WO2010/072272
PCT Pub. Date: Jul. 1, 2010

(65) Prior Publication Data
US 2011/0254731 A1 Oct. 20, 2011

(51) Int. Cl.
*H04B 7/185* (2006.01)
*G01S 19/05* (2010.01)
*G01S 19/09* (2010.01)
*G01S 19/25* (2010.01)
*G01S 5/00* (2006.01)

(52) U.S. Cl.
CPC .......... *G01S 19/05* (2013.01); *G01S 19/09* (2013.01); *G01S 19/258* (2013.01); *G01S 5/0036* (2013.01)
USPC ........... 235/492; 342/352; 342/353; 342/354; 342/355; 342/356

(58) Field of Classification Search
USPC ...................... 235/385; 342/357.25
See application file for complete search history.

(56) References Cited

U.S. PATENT DOCUMENTS

| 6,671,620 B1 * | 12/2003 | Garin et al. ............... 701/470 |
| 6,975,266 B2 * | 12/2005 | Abraham et al. ........ 342/357.59 |
| 7,463,979 B2 * | 12/2008 | King .......................... 701/469 |

(Continued)

FOREIGN PATENT DOCUMENTS

| EP | 1942459 | 7/2008 |
| FR | 2809851 | 12/2001 |

(Continued)

OTHER PUBLICATIONS

Pozzobon, et al., Secure Tracking Using Trusted GNSS Receivers and Galileo Authentication Services, Journal of Global Positing Systems, Australia, vol. 3, No. 1-2, pp. 200-207 (2004).

(Continued)

*Primary Examiner* — Christopher Stanford
(74) *Attorney, Agent, or Firm* — McCarter & English, LLP

(57) ABSTRACT

Disclosed herein is a tracking system configured to track a product and/or an activity. The tracking system comprises a tracing device and a verification server. The tracing device is coupled with the verification server by means of communication means configured to allow exchange of data between the tracing device and the verification server. The tracing device is coupled with a first satellite localization receiver which is configured to receive signals from a satellite localization system, process the received signals to obtain satellite localization observables, and compute locations based on the satellite localization observables. The tracing device is configured to acquire from the first satellite localization receiver positioning data. The tracing device is further configured to provide the verification server with the positioning data and the satellite localization observable acquired from the satellite localization receiver. The verification server is configured to perform a location consistency check.

25 Claims, 3 Drawing Sheets

(56) References Cited

U.S. PATENT DOCUMENTS

| | | | |
|---|---|---|---|
| 7,900,835 B2 * | 3/2011 | Togashi et al. | 235/385 |
| 2005/0062643 A1 * | 3/2005 | Pande et al. | 342/357.1 |
| 2006/0253590 A1 | 11/2006 | Nagy et al. | |

FOREIGN PATENT DOCUMENTS

| WO | WO 00/26111 | 5/2000 |
|---|---|---|
| WO | WO 2007/049011 | 5/2007 |
| WO | WO 2007/049344 | 5/2007 |

OTHER PUBLICATIONS

PCT International Search Report and Written Opinion dated Sep. 10, 2009.

* cited by examiner

HIGH-RELIABILITY PRODUCT/ACTIVITY TRACKING SYSTEM

TECHNICAL FIELD OF THE INVENTION

The present invention relates in general to product and/or activity tracing and tracking.

In particular, the present invention finds advantageous, but non-exclusive, application in all those fields wherein a reliable and guaranteed tracking of a product and/or of an activity represents a mandatory and/or valuable requirement for the product and/or the activity.

BACKGROUND ART

As is known, nowadays, the need to track products and/or activities by means of accurate, reliable, and verified information about the products and/or the activities is more and more felt.

Generally, tracking a product and/or an activity comprises collecting information about all major events related to the product and/or to the activity to be tracked.

In particular, the information about all major events related to a product to be tracked may comprise geographical location and time data relating to production, processing, storage, transportation and delivery of the product, while the information about all major events related to an activity to be tracked may comprise geographical location and time data relating to different tasks carried out during the activity including the correct and consistent sequence of the tasks to be tracked. These data may be then used by third parties, enforcers, controllers, and consumers/customers as an objective and reliable evidence of compliance of the product and/or of the activity with laws, regulations, procedures, best practices, and quality standards.

Therefore, the number of systems and services, which provide tracking of products and/or activities with the aim of proving compliance with specific rules and regulations towards third parties and final consumers/customers, is more and more growing.

Examples of applications for which a reliable and guaranteed tracking is important are: waste transportation, dangerous goods transportation, valuable goods transportation, perishable goods transportation, guaranteed-quality food/product tracking, pharmaceutical product distribution, cold chain tracking, guaranteed-origin product protection and enforcement, critical bank transactions, and tracking of delivery of donations and humanitarian aids. For all these applications geographical location and time of all major events related to the product and/or to the activity are essential features in order to prove quality and compliance of the product and/or of the activity with rules and laws, hence a reliable tracking is often a mandatory requirement.

For example, in European Union and USA food traceability for whole value chain, i.e., from producer to consumer, is a priority for public safety, for enforcement of quality and brand labels, and for support to "shortest delivery chain" implementation for sustainable environment impacts.

In particular, the European Union is very active in the field of food quality, as demonstrated, for example, by the European Union Regulation n. 2081/92 adopted in 1992 and aimed to regulate and protect geographical indications and designations of origin for agricultural products and foodstuffs. An example of successful story in this context is represented by the "Parmigiano Reggiano" which is one of the most well-known and developed Protected-Designation-of-Origin (PDO) food product in the world. Parmigiano Reggiano case has demonstrated the value of the PDO concept and the sustainability of the business model where the investment has been largely justified by the revenues increase.

In detail, as appears after several years from the introduction of the PDO concept, despite the evident advantages for the whole food value chain, the PDO concept has demonstrated a limitation in enforcement and control tasks since these tasks are in charge to the same organization that has registered, on voluntary basis, the PDO brand to be protected. Indeed this model has an intrinsic potential conflict of interest while performing controls and enforcement.

Another example of application for which a reliable and guaranteed tracking is important is represented by the "donation traceability" related to big national and international initiatives aimed to provide quick relief and support to regions damaged by natural disasters (e.g. tsunami, earthquakes, floods) or major humanitarian emergencies (e.g. civil wars, terrorist attacks). These initiatives are frequently implemented with many small money donations, usually made using mobile phones sending SMSs, ie., messages sent by means of the Short Message Service, allowing the collection and the delivery of important amount of money to local administrations or emergency forces involved in the area of interest. The reliable and guaranteed tracking of those small money transactions could be tracked in term of "events" associated to geographical location and time with the aim to provide evidence of real and actual delivery of each, even small, money contribution.

As previously said, tracking a product and/or an activity comprises collecting information about all the major events, comprising respective geographical location and time data, related to the product and/or the activity.

Then, this information is often stored on tracking means, such as, in the case of a tracked product, a label which is coupled with the tracked product, in order to provide, with this information, who is interested in it, such as a seller, a freight operator, a controller, or a final customer.

In the past the tracking means were always printed paper labels, while during the last years more and more smart labels have been exploited.

In fact, a lot of smart labels, such as those based on barcodes or on Radio Frequency IDentification (RFID) technology, are already used to store digital data on small size media, such as plastic or paper labels, to be attached to products in order to provide different users, such as sellers, freight operators, controllers, final customers, with information and data about the products. Generally, the smart labels are readable by means of specific devices.

Moreover, smart label technology is continuously evolving with big investments and research efforts all over the world, and the trend is in the direction of smaller and higher-capacity electronic labels with anti-theft and anti-fraud characteristics.

An example of anti-fraud electronic label is represented by smart electronic labels inserted in corks of high quality wine bottles in order to avoid falsifications and frauds.

Furthermore, since, as previously said, the information about all major events related to a product and/or an activity to be tracked may comprise geographical location and time data, a lot of tracking systems have been developed based on satellite localization also because of its low cost and worldwide availability.

Generally, known satellite-localization-based product tracking systems exploit satellite localization systems, such as Global Positioning System (GPS), to compute positions of a product to be tracked, for example, when it is produced, processed, stored, transported, and delivered. Then each computed position and a corresponding time, i.e., that date and that time when the position is assumed by the product, are stored on the tracking means which are coupled with the product.

Moreover, known satellite-localization-based activity tracking systems exploit satellite localization systems, such as GPS, to compute respective locations where different tasks of the activity to be tracked are carried out. Then each computed location and a corresponding time, i.e., that date and that time when the corresponding task is carried out, are made available to who can be interested to them.

In this respect, for some tracking applications, for example for bank transactions and donation traceability, the storage of the tracking data on a physical support is not always needed while is important, for various reasons, to produce and to provide different users with the tracking data in electronic form, for example making them available on an on-line database which may be public or have a controlled and restricted access.

Nevertheless, the known satellite-localization-based tracking systems may be vulnerable and, thence, can be questioned when traceability relevance is high and when collected information reliability may be affected by voluntary or involuntary corruptions or even falsifications for fraudulent purposes.

In fact, for example, a wine producer could voluntary change the geographical location stored on labels coupled with wine bottles produced by him in order to simulate a production geographical location (or time/date) different from the real one, making fraudulently result a high quality zone related to a valuable Protected Geographical Indication (PGI) or PDO.

Another example could concern a company in charge of dangerous goods transportation ruled by national law and according to a contract with a public administration. If rule abidance control is based on GPS-based tracking, effectiveness of this control is questionable due to possibility to record false positions to demonstrate compliance with rules/laws.

Indeed, for example, it's possible to record and, then, to store false positions on the tracking means either by copying genuine location data from genuine labels and pasting them on the tracking means, or using satellite localization signal spoofing attacks based on false satellite localization signals generated just to compute specific false positions which are more valuable than the real ones, or which are admitted while the real ones are not.

In general, current satellite-localization-based tracking systems are adopted, configured and operated by the same company and user that is subject of control with a clear conflict of interests. This anomaly does not allow a third party, such as a controller, to have full confidence on the traceability outputs. The controller is de facto obliged to rely on the honesty of the company, on the generally recognized "universal service" nature of the Global Navigation Satellite System (GNSS) signals available worldwide and on the technical difficulties in manipulating the GNSS data and GNSS receivers.

Therefore, weakness of satellite-localization-based tracking systems in term of reliability and credibility against third parties, and vulnerability against frauds, is evident. Accordingly it's necessary to guarantee positioning towards third parties, such as controllers, sellers, consumers, and to have an objective evidence of truthfulness of the stored location data.

Thence, most recently developed satellite-localization-based tracking systems try to generate and provide specific data which are intended to guarantee truthfulness of the stored location data, and to augment their reliability against voluntary or involuntary corruptions, and falsifications.

An example of this type of tracking systems is disclosed in the International Patent Application having WO2007049344 as publication number.

In detail, WO2007049344 discloses a food product tracing system which traces a food product collecting positions and times corresponding to production, shipment, transportation, etc., of the food product.

In particular, in WO2007049344 positions are computed based on the GPS. For example, according to WO2007049344, a producer of a food product exploits a GPS receiver to obtain a location of production of the food product, this location being used to trace the food product.

Furthermore, the food product tracing system disclosed in WO2007049344 comprises a verification server apparatus which receives from a user, such as a producer of a food product, a position and a time, such as a production location and a shipment time of the food product, and generates verification information by synthesizing the position, the time, and unique data obtained only at either one of the position and the time.

In particular, the verification information is information verifying a position and a time of the food product, for example verifying the production location and the shipment time of the food product.

Exploiting unique data obtained only at either one of the position and the time in order to generate the verification information improves probative value of the verification information. Therefore, according to WO2007049344, the verification information should guarantee a position and a time towards third parties, such as controllers, sellers, consumers, and should represent an objective evidence of truthfulness of the position and of the time.

However, WO2007049344 teaches to exploit only two types of unique data, i.e.,
  weather data which the verification server apparatus acquires from a weather satellite, and which are unique data obtained only at a predetermined time, such as shipment date and time of the food product, and
  natural phenomenon information, such as temperature, humidity, atmospheric pressure, altitude, and wind velocity, which are unique data obtained only at a predetermined position, such as a production location of the food product.

In particular, WO2007049344 teaches
  in one embodiment, to exploit only the weather data to synthesize the verification information, thus the verification information guaranteeing the truthfulness only of the time and not also of the position; and
  in another embodiment, to exploit the natural phenomenon information in addition to the weather data to synthesize the verification information, thus the verification information guaranteeing the truthfulness of the position and of the time.

Furthermore, WO2007049344 lacks in teaching how to obtain the natural phenomenon information.

OBJECT AND SUMMARY OF THE INVENTION

The Applicant has noticed that the food product tracing system disclosed in WO2007049344 is a very complex system because, in order to operate, it needs to exploit systems very different from each other, such as the GPS and a weather satellite system.

In particular, the food product tracing system according to WO2007049344, in order to operate, needs necessarily to exploit at least a weather satellite system to obtain the weather data in order to synthesize the verification information.

Furthermore, in order to obtain also the natural phenomenon information, the food product tracing system according to WO2007049344 should be coupled with a system or a plurality of devices or systems configured to sense temperature, humidity, atmospheric pressure, altitude, and wind velocity at positions computed by users, even if WO2007049344 does not provide any teaching about that.

All these features make the architecture of the food product tracing system according to WO2007049344 very complex and expensive.

The objective of present invention is then to provide a satellite-localization-based tracking system which is reliable against voluntary or involuntary corruptions, and falsifications, and which, in general, does not have an architecture which is complex and expensive, and, in particular, is different from the food product tracing system disclosed in WO2007049344.

These and other objectives are achieved by the present invention in that it relates to a product/activity tracking system, as defined in the appended claims.

The present invention achieves the aforementioned objectives by means of a tracking system configured to track a product and/or an activity and comprising a tracing device and a verification server, the tracing device being coupled with the verification server by means of communication means configured to allow exchange of data between the tracing device and the verification server.

Moreover, the tracing device is coupled with a satellite localization receiver to acquire data therefrom.

The satellite localization receiver is configured to receive signals from a satellite localization system, to process the received signals to obtain satellite localization observables, and to compute locations based on the satellite localization observables.

Furthermore, the tracing device is configured to:
acquire from the satellite localization receiver positioning data, the positioning data comprising a location computed by the satellite localization receiver, and a location time which represents time and date at which the location is computed by the satellite localization receiver, the positioning data being related to a product and/or an activity to be tracked;
select a satellite localization observable based on which the location is computed by the satellite localization receiver;
acquire from the satellite localization receiver the selected satellite localization observable; and
provide the verification server with the positioning data, and the satellite localization observable acquired from the satellite localization receiver.

Furthermore, the verification server, in turn, is configured to:
perform a location consistency check based on the location comprised in the positioning data provided by the tracing device, and on the satellite localization observable provided by the tracing device;
generate a validation code on the basis of an outcome of the location consistency check, and on the basis of the positioning data provided by the tracing device; and
provide the tracing device with the generated validation code.

Finally, the tracing device is further configured to:
store the positioning data and the validation code provided by the verification server on tracking means associated with the product and/or the activity to be tracked.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREFERRED EMBODIMENTS OF THE INVENTION

Figure 1:
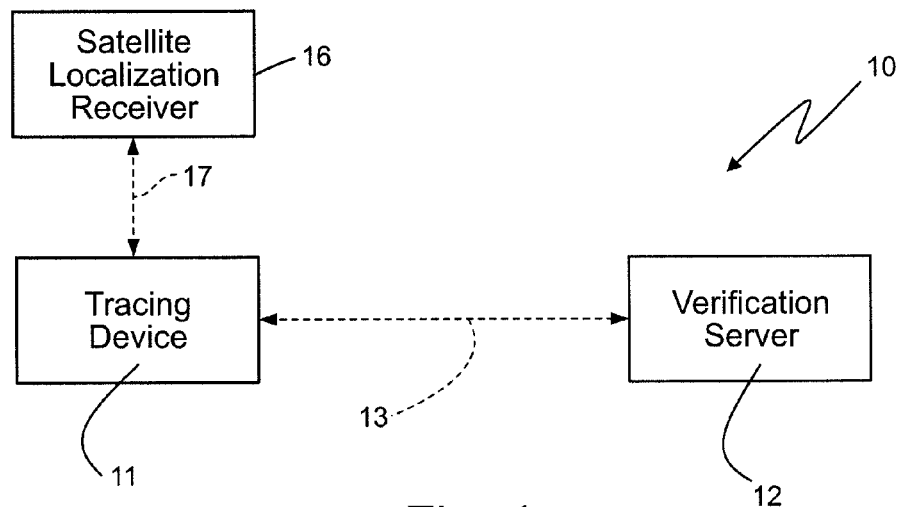
FIG. 1 shows schematically a tracking system according to the present invention.

The following discussion is presented to enable a person skilled in the art to make and use the invention. Various modifications to the embodiments will be readily apparent to those skilled in the art, without departing from the scope of the present invention as claimed.

Thus, the present invention is not intended to be limited only to the embodiments shown, but is to be accorded the widest scope consistent with the principles and features disclosed herein and defined in the appended claims.

In general, the present invention relates to a tracking system configured to track a product and/or an activity by collecting and storing in real time information about at least one event related to the product and/or to the activity to be tracked.

In particular, the information about the at least one event related to the product to be tracked comprises positioning data which, in turn, comprise a geographical location and a location time which correspond to the at least one event, while the information about the at least one event related to the activity to be tracked comprises positioning data which, in turn, comprise a geographical location and a location time which correspond to the at least one event.

In particular, the location time represents absolute universal time and date, and local time and date.

Conveniently, the tracking system according to the present invention may comprise collecting and storing in real time information about all major events related to the product and/or to the activity to be tracked.

In particular, the information about all major events related to the product to be tracked may comprise, conveniently, the positioning data corresponding to each of all major events related to the product to be tracked, such as production, processing, storage, transportation and delivery of the product, while the information about all major events related to the activity to be tracked may comprise, conveniently, the positioning data corresponding to each of all major events related to the activity to be tracked, each of all major events related to the activity to be tracked being a specific task carried out during the activity.

The collected and stored positioning data may be used by third parties, enforcers, controllers, and consumers/customers as an objective and reliable evidence of compliance of the tracked product and/or of the tracked activity with laws, regulations, procedures, best practices, and quality standards and requirements.

Moreover, the tracking system according to the present invention automatically guarantees correctness, reliability, authenticity and genuineness of the positioning data which are obtained based on satellite localization, and are used to track the product or the activity.

Furthermore, the tracking system according to the present invention is configured to generate traceability data which encapsulate the guaranteed positioning data and, conveniently, also other quality attributes depending on a specific application of the tracking system, for example temperature for cold chain tracking, specific processing steps for food production, storage, and delivery tracking.

In particular, FIG. 1 shows schematically a tracking system 10 according to the present invention, the tracking system 10 being configured to track a product and/or an activity, and comprising:
 a tracing device 11; and
 a verification server 12.

In detail, the tracing device 11 is coupled with the verification server 12 by means of communication means used to exchange data between the tracing device and the verification server 12, as shown in the FIG. 1 by a dotted bi-directional arrow 13.

Moreover, the tracing device 11 is coupled with a Global Navigation Satellite System (GNSS) receiver, e.g., a satellite localization receiver 16, by communication means shown by a dotted bi-directional arrow 17 to acquire data therefrom. For example, the GNSS receiver may be, conveniently, a GPS receiver, a Galileo receiver, or a combined multiple constellation receiver able to catch signals from GPS, Galileo and other GNSSs available in the future.

As is known, at a given instant, a generic GNSS receiver operates by receiving signals from the GNSS, processing the received signals to obtain GNSS observables, and computing a location based on the GNSS observables.

Furthermore, the tracing device 11 is configured to:
 acquire in real time from the GNSS receiver positioning data comprising a geographical location computed by the GNSS receiver, and a location time which represents universal and local time and date at which the geographical location is computed by the GNSS receiver, the positioning data being related to a product and/or an activity to be tracked;
 select a GNSS observable based on which the geographical location is computed by the GNSS receiver;
 acquire from the GNSS receiver the selected GNSS observable; and
 provide the verification server 12 with the positioning data and the GNSS observable acquired from the GNSS receiver.

In this respect, the present invention in the following will teach to use the GNSS observable to check, in general, the computed geographical location, and, conveniently, whether the computed geographical location is consistent and coherent with the GNSS observable based on which the geographical location has been computed by the GNSS receiver.

In turn, the verification server 12, is configured to:
 perform a location consistency check based on the geographical location comprised in the positioning data provided by the tracing device 11, and on the GNSS observable provided by the tracing device 11;
 generate a validation code on the basis of an outcome of the location consistency check, and of the positioning data provided by the tracing device 11; and
 provide the tracing device 11 with the validation code.

Moreover, the tracing device 11 is further configured to:
 store the positioning data and the validation code provided by the verification server 12 on tracking means associated with the product and/or the activity to be tracked.

Conveniently, the tracing device 11 is configured to select a plurality of GNNS observables in order to improve reliability of the location consistency check performed by the verification server 12.

Preferably, the tracing device 11 is configured to select the GNNS observable, or the plurality of GNSS observables, to be acquired from the GNSS receiver according to instructions provided in real time by the validation server 12 on the basis of a predefined algorithm based on secret ad-hoc functions of the positioning data, and, conveniently, of other configurable parameters.

In this respect, the predefined algorithm, which allows the tracing device 11 to select dynamically the GNSS observable, or the plurality of GNSS observables, among those acquirable, introduces an additional real-time anti-fraud protection, since the GNSS observable, or the plurality of GNSS observables, to be selected, and then to be acquired, are not known a priori by the tracing device 11.

Accordingly, the verification server 12 may be further configured to:
 generate the instructions on the basis of the predefined algorithm based on secret ad-hoc functions of the positioning data, and, conveniently, of other configurable parameters; and
 provide the tracing device 11 with the instructions.

Preferably, the validation code comprises a first part, which is readable, and a second part, which is encrypted with an encryption key known only by the verification server 12.

Conveniently, the validation code may encapsulate the positioning data and the outcome of the location consistency check.

Furthermore, the verification server 12, preferably, is configured to perform the location consistency check by checking whether the geographical location comprised in the positioning data provided by the tracing device 11 is consistent with the GNSS observable, or the plurality of GNSS observables, provided by the tracing device 11.

Conveniently, the verification server 12 may be further configured to:
 generate a location consistency check result indicating whether the location comprised in the positioning data provided by the tracing device 11 is consistent with the GNSS observable, or the plurality of GNSS observables, provided by the tracing device 11, the location consistency check result being the outcome of the location consistency check.

Therefore, the location consistency check result indicates whether the position is correct and genuine in term of location time and geographical location.

Consequently, also the validation code indicates whether the position is correct and genuine in term of location time and geographical location.

More conveniently, the location consistency check result may be generated positive if the geographical location is consistent with the GNSS observable, or the plurality of GNSS observables, while may be generated negative if the location is not consistent with the GNSS observable, or the plurality of GNSS observables.

Preferably, the GNSS receiver coupled with the tracing device 11 is a Galileo-enabled GNSS receiver, i.e., a GNSS receiver which is configured to receive signals from Galileo Navigation System, to process the received signals to obtain Galileo observables, and to compute locations based on the Galileo observables.

Moreover, the tracing device 11 is further configured to:
 acquire from the Galileo-enabled GNSS receiver encrypted Galileo signal authentication data which are received by the Galileo-enabled GNSS receiver from the Galileo Navigation System, and are current at the location time; and provide the verification server 12 also with the encrypted Galileo signal authentication data acquired from the Galileo-enabled GNSS receiver.

In this respect, as is known, the Galileo Navigation System, as one of its innovative features, foresees authentication of transmitted signals by means of the Galileo signal authentication data, which change as a function of time, and are transmitted as an encrypted digital signature coupled with the transmitted signals, in order to prove genuineness of the transmitted signals, i.e., in order to prove that the received signals have been actually transmitted by the "real" Galileo Navigation System.

Therefore, the present invention in the following will teach to exploit preferably also the Galileo signal authentication data to improve tracking reliability against voluntary corruptions and falsifications, such as those based on GNSS signal spoofing attacks and falsification of the actual location time.

Indeed, only the verification server 12 uses a Galileo authentication key necessary to decrypt the encrypted Galileo authentication data provided by the tracing device 11. This Galileo key is provided by the Galileo Navigation System through its key distribution facility/ies to the verification server 12 according to operational procedures defined by the Galileo System Operator.

Accordingly, the verification server 12 is further configured to:

perform a first Galileo signal authenticity check based on the encrypted Galileo signal authentication data provided by the tracing device 11, and on the Galileo key provided by the Galileo Navigation System through its key distribution facility/ies; and generate the validation code also on the basis of an outcome of the first Galileo signal authenticity check.

Conveniently, the validation code may encapsulate also the outcome of the first Galileo signal authenticity check.

Furthermore, the verification server 12, preferably, is configured to perform the first Galileo signal authenticity check by checking whether the encrypted Galileo signal authentication data provided by the tracing device 11 are decryptable using the Galileo key.

Conveniently, the verification server 12 may be further configured to:

generate a first Galileo signal authenticity check result indicating whether the encrypted Galileo signal authentication data provided by the tracing device 11 are decryptable using the Galileo key, the first Galileo signal authenticity check result being the outcome of the first Galileo signal authenticity check.

Therefore, the first Galileo signal authenticity check result indicates whether the geographical location has been actually computed based on the Galileo Navigation System.

Consequently, also the validation code indicates whether the geographical location has been actually computed based on the "real" signals transmitted by the Galileo Navigation System.

More conveniently, the first Galileo signal authenticity check result may be generated positive if the encrypted Galileo signal authentication data provided by the tracing device 11 are decryptable using the Galileo key, while may be generated negative if the encrypted Galileo signal authentication data provided by the tracing device 11 are not decryptable using the Galileo key.

Preferably, as additional functionality aimed to reinforce check robustness, the verification server 12 is coupled with a second Galileo-enabled GNSS receiver to acquire data therefrom, and is further configured to:

acquire from the second Galileo-enabled GNSS receiver encrypted Galileo signal authentication data received by the second Galileo-enabled GNSS receiver from the Galileo Navigation System;

store the encrypted Galileo signal authentication data acquired from the second Galileo receiver;

perform a second Galileo signal authenticity check based on the encrypted Galileo signal authentication data provided by the tracing device 11, on the location time comprised in the positioning data provided by the tracing device 11, and on at least one of the stored encrypted Galileo signal authentication data; and generate the validation code also on the basis of an outcome of the second Galileo signal authenticity check.

Conveniently, the validation code may encapsulate also the outcome of the second Galileo signal authenticity check.

Furthermore, the verification server 12, preferably, is configured to perform the second Galileo signal authenticity check by checking whether the encrypted Galileo signal authentication data provided by the tracing device 11 are consistent with the stored encrypted Galileo signal authentication data current at the location time which is comprised in the positioning data provided by the tracing device 11.

In particular, the second Galileo signal authenticity check may be performed comparing the encrypted Galileo signal authentication data provided by the tracing device 11 and the stored encrypted Galileo signal authentication data corresponding to the location time after respective decryptions.

Conveniently, the verification server 12 may be further configured to:

generate a second Galileo signal authenticity check result indicating whether the encrypted Galileo signal authentication data provided by the tracing device 11 are equal to the stored encrypted Galileo signal authentication data current at the location time, the second Galileo signal authenticity check result being the outcome of the second Galileo signal authenticity check.

Therefore, the first Galileo signal authenticity check result indicates whether the location time is correct, and whether the location has been actually computed based on the Galileo Navigation System.

Consequently, also the validation code indicates whether the location time is correct, and whether the geographical location has been actually computed based on the "real" signals transmitted by the Galileo Navigation System.

More conveniently, the second Galileo signal authenticity check result may be generated positive if the encrypted Galileo signal authentication data provided by the tracing device 11 are correct and equal to the stored encrypted Galileo signal authentication data corresponding to the location time, while may be generated negative if the encrypted Galileo signal authentication data provided by the tracing device 11 are not equal to the stored encrypted Galileo signal authentication data corresponding to the location time.

Preferably, the tracing device 11 is coupled with the Galileo-enabled GNSS receiver and is further configured to:

acquire from the Galileo-enabled GNSS receiver an Integrity message which is received by the Galileo-enabled GNSS receiver from the Galileo Navigation System as part of Galileo "Safety of Life" (SoL) service, and is valid at the location time; and provide the verification server 12 also with the Galileo Integrity message acquired from the Galileo-enabled GNSS receiver.

In this respect, the present invention in the following will teach to use preferably also the Integrity messages transmitted by the Galileo Navigation System as an evidence of authentication of signal source and true acquisition time used to compute the location.

Accordingly, the verification server 12 is coupled with the second Galileo-enabled GNSS receiver and is further configured to:

- acquire from the second Galileo-enabled GNSS receiver Galileo Integrity messages received by the second Galileo receiver from the Galileo Navigation System;
- store the Galileo Integrity messages acquired from the second Galileo-enabled GNSS receiver;
- perform a third Galileo signal authenticity check based on the Galileo Integrity message provided by the tracing device 11, on the location time comprised in the positioning data provided by the tracing device 11, and on at least one of the stored Galileo Integrity messages; and
- generate the validation code also on the basis of an outcome of the third Galileo signal authenticity check.

Conveniently, the validation code may encapsulate also the outcome of the third Galileo signal authenticity check.

Furthermore, the verification server 12, preferably, is configured to perform the third Galileo signal authenticity check by checking whether the Galileo Integrity message provided by the tracing device 11 is consistent with the stored Galileo Integrity message valid at the location time comprised in the positioning data provided by the tracing device 11.

Conveniently, the verification server 12 may be further configured to:

- generate a third Galileo signal authenticity check result indicating whether the Galileo Integrity message provided by the tracing device 11 is equal to the stored Galileo Integrity message valid at the location time comprised in the positioning data provided by the tracing device 11, the third Galileo signal authenticity check result being the outcome of the third Galileo signal authenticity check.

More conveniently, the third Galileo signal authenticity check result may be generated positive if the Galileo Integrity message provided by the tracing device 11 is equal to the stored Galileo Integrity message valid at the location time, while may be generated negative if the Galileo Integrity message provided by the tracing device 11 is not equal to the stored Galileo Integrity message valid at the location time.

Therefore, since, as is known, the Galileo Navigation System transmits every second a corresponding Galileo Integrity message which comprises an indication of respective time period of validity, the Galileo Integrity message provided by the tracing device 11 allows the verification server 12 to check whether the location time is correct and the geographical location has been actually computed based on the Galileo Navigation System.

Indeed, the Galileo integrity is a continuously changing source of numerical data transmitted by the Galileo Navigation System since it is based on a continuous monitoring of the Galileo SoL service signals, as consequence it is used to check the truthfulness of the location time.

Accordingly, the third Galileo signal authenticity check result indicates whether the location time is correct and the geographical location has been really computed based on the Galileo Navigation System.

Consequently, also the validation code indicates whether the location time is correct and the geographical location has been actually computed based on the Galileo Navigation System.

Preferably, the GNSS receiver coupled with the tracing device 11 is further configured to receive signals also from a Satellite Based Augmentation System (SBAS), such as European Geostationary Navigation Overlay Service (EGNOS), Wide Area Augmentation System (WAAS), and Multi-constellation Satellite Augmentation System (MSAS), to process the received signals to obtain augmentation data, and to compute the locations also based on the augmentation data in order to improve performances of location computation when considered geographical area is covered by a corresponding SBAS regional service, thus the GNSS receiver being a SBAS-enabled GNSS receiver.

Moreover, the tracing device 11, preferably, is further configured to:

- acquire from the SBAS-enabled GNSS receiver a SBAS Integrity message which is received by the SBAS-enabled GNSS receiver from the SBAS, and is valid at the location time; and
- provide the verification server 12 also with the SBAS integrity message acquired from the SBAS-enabled GNSS receiver.

In this respect, the present invention in the following will teach to use preferably also the Integrity messages transmitted by the SBAS as an additional evidence of authentication of signals and time used to compute the location.

Accordingly, the verification server 12, in turn, is coupled with a second SBAS-enabled GNSS receiver, and is further configured to:

- acquire from the second SBAS-enabled GNSS receiver SBAS Integrity messages received by the second SBAS-enabled GNSS receiver from the SBAS;
- store the SBAS Integrity messages acquired from the second SBAS-enabled GNSS receiver;
- perform a SBAS signal authenticity check based on the SBAS Integrity message provided by the tracing device 11, on the location time comprised in the positioning data provided by the tracing device 11, and on at least one of the stored SBAS Integrity messages; and
- generate the validation code also on the basis of an outcome of the SBAS signal authenticity check.

Conveniently, the validation code may encapsulate also the outcome of the SBAS signal authenticity check.

Furthermore, the verification server 12, preferably, is configured to perform the SBAS signal authenticity check by checking whether the SBAS Integrity message provided by the tracing device 11 is consistent with the stored SBAS Integrity message valid at the location time comprised in the positioning data provided by the tracing device 11.

Conveniently, the verification server 12 may be further configured to:

- generate a SBAS signal authenticity check result indicating whether the SBAS Integrity message provided by the tracing device 11 is equal to the stored SBAS Integrity message valid at the location time comprised in the positioning data provided by the tracing device 11, the SBAS signal authenticity check result being the outcome of the SBAS signal authenticity check.

More conveniently, the SBAS signal authenticity check result may be generated positive if the SBAS Integrity message provided by the tracing device 11 is equal to the stored SBAS Integrity message valid at the location time, while may be generated negative if the SBAS Integrity message provided by the tracing device 11 is not equal to the stored SBAS Integrity message valid at the location time.

Therefore, since, as is known, also the SBAS transmits every second a corresponding SBAS Integrity message which comprises an indication of respective time period of validity, the SBAS Integrity message provided by the tracing device 11 allows the verification server 12 to check whether the location time is correct and the geographical location has been actually computed based on SBAS.

Accordingly, the SBAS signal authenticity check result indicates whether the location time is correct and the geographical location has been really computed based on the SBAS.

Consequently, also the validation code indicates whether the location time is correct and the geographical location has been really computed based on SBAS.

Preferably, the tracing device 11 is coupled with the SBAS-enabled GNSS receiver, and is further configured to:
  acquire from the SBAS-enabled GNSS receiver SBAS augmentation data based on which the geographical location is computed; and
  provide the verification server 12 also with the SBAS augmentation data acquired from the SBAS-enabled GNSS receiver.

In this respect, the present invention in the following will teach to use preferably also the SBAS augmentation data to check, in general, whether the computed geographical location is correct and, in particular, whether the computed geographical location is consistent with the SBAS augmentation data based on which the location has been computed.

Accordingly, the verification server 12, in turn, is coupled with the second SBAS-enabled GNSS receiver and is further configured to:
  acquire from the second SBAS-enabled GNSS receiver SBAS augmentation data received by the second SBAS-enabled GNSS receiver from the SBAS;
  store the SBAS augmentation data acquired from the second SBAS-enabled GNSS receiver;
  perform a multiple check based on the SBAS augmentation data provided by the tracing device 11, on the positioning data provided by the tracing server 12, and on at least one of the stored SBAS augmentation data; and
  generate the validation code also on the basis of an outcome of the multiple check.

Conveniently, the validation code may encapsulate also the outcome of the multiple check.

Furthermore, the verification server 12, preferably, is configured to perform the multiple check by checking whether the SBAS augmentation data provided by the tracing device 11 are consistent with the stored SBAS augmentation data valid at the location time comprised in the positioning data provided by the tracing device 11, and whether the geographical location comprised in the positioning data provided by the tracing device 11 is consistent with the stored SBAS augmentation data valid at the location time comprised in the positioning data provided by the tracing device 11.

Conveniently, the verification server 12 may be further configured to:
  generate a multiple check result indicating whether the SBAS augmentation data provided by the tracing device 11 are equal to the stored SBAS augmentation data valid at the location time comprised in the positioning data provided by the tracing device 11, and whether the geographical location comprised in the positioning data provided by the tracing device 11 is consistent with the stored SBAS augmentation data valid at the location time comprised in the positioning data provided by the tracing device 11, the multiple check result being the outcome of the multiple check.

More conveniently, the multiple check result may be generated positive if the SBAS augmentation data provided by the tracing device 11 are equal to the stored SBAS augmentation data valid at the location time, and the geographical location is consistent with the stored SBAS augmentation data valid at the location time, while may be generated negative if the SBAS augmentation data provided by the tracing device 11 are not equal to the stored SBAS augmentation data valid at the location time and/or if the geographical location is not consistent with the stored SBAS augmentation data valid at the location time.

Therefore, the multiple check result indicates whether the location time is correct, and whether the geographical location is correct and has been actually computed based on SBAS.

Consequently also the validation code indicates whether the location time is correct, and whether the geographical location is correct and has been actually computed based on SBAS.

In this respect, if the SBAS-enabled GNSS receiver coupled with the tracing device 11 is an EGNOS-enabled GNSS receiver, the verification server 12 may be, conveniently, coupled with an EGNOS Data Access Service (EDAS) interface to acquire EGNOS augmentation data and/or EGNOS Integrity messages therefrom.

It may be appreciated that the tracking system 10 according to the present invention is configured to perform:
  in one embodiment, at least the location consistency check;
  in a second embodiment, the location consistency check, and at least one check comprised among the first Galileo signal authenticity check, the second Galileo signal authenticity check, the third Galileo signal authenticity check, the SBAS signal authenticity check, and the multiple check;
  in a third embodiment, the location consistency check, and at least two checks comprised among the first Galileo signal authenticity check, the second Galileo signal authenticity check, the third Galileo signal authenticity check, the SBAS signal authenticity check, and the multiple check;
  in a fourth embodiment, the location consistency check, and at least three checks comprised among the first Galileo signal authenticity check, the second Galileo signal authenticity check, the third Galileo signal authenticity check, the SBAS signal authenticity check, and the multiple check;
  in a fifth embodiment, the location consistency check, and at least four checks comprised among the first Galileo signal authenticity check, the second Galileo signal authenticity check, the third Galileo signal authenticity check, the SBAS signal authenticity check, and the multiple check; and,
  in a sixth embodiment, the location consistency check, the first Galileo signal authenticity check, the second Galileo signal authenticity check, the third Galileo signal authenticity check, the SBAS signal authenticity check, and the multiple check.

Moreover, the verification server 12 may be, conveniently, further configured to:
  generate a validation result based on the respective outcome of all the performed checks; and
  generate the validation code also on the basis of the validation result.

Conveniently, the validation code may encapsulate also the validation result.

More conveniently, the verification server 12 may be further configured to:
  assign to the validation result a positive value if all the performed checks have the respective outcome which is positive; and assign to the validation result a negative value if at least one of all the performed checks has the respective outcome which is negative. Preferably, the tracing device 11 is further configured to:

generate event log data comprising information about an event which corresponds to, and is to be associated with, the positioning data, and is related to the product and/or the activity to be tracked; and provide the verification server 12 also with the event log data.

Accordingly, the verification server 12 is further configured to:

generate the validation code also on the basis of the event log data provided by the tracing device 11.

Conveniently, the validation code may encapsulate also the event log data.

Furthermore, the tracing device 11, preferably, is further configured to:

detect traceability data stored on the tracking means;

if the traceability data are detected, update the traceability data on the tracking means by adding to the traceability data the positioning data, the event log data, and the validation code provided by the verification server 12; and if the traceability data are not detected, generate traceability data and store the generated traceability data on the tracking means, the generated traceability data comprising the positioning data, the event log data, and the validation code provided by the verification server 12.

Figure 2:
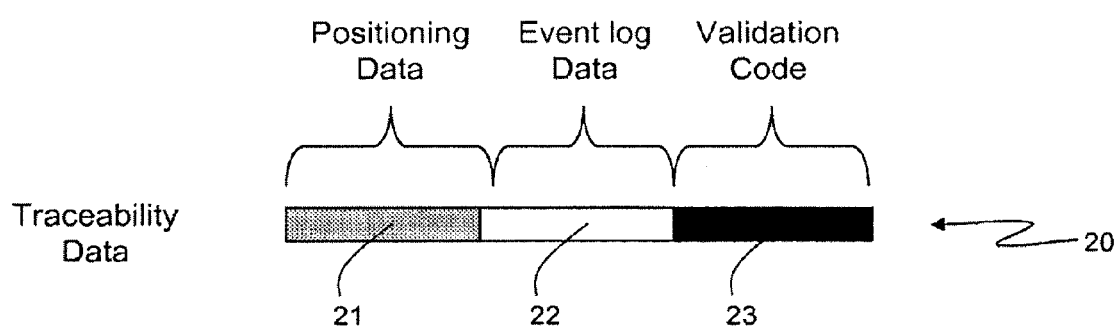
FIG. 2 shows a first example of traceability data according to the present invention.

In particular, FIG. 2 shows a first example of traceability data 20 according to the present invention.

In detail, as shown in the FIG. 2, the traceability data 20 comprise positioning data 21, event log data 22, and a validation code 23.

Conveniently, the verification server 12 comprises a Web portal which is configured to, during a mandatory registration process, register a user and to provide the user with a user identification code and a tracing device identification code, or codes in case of multiple instances, the user identification code identifying univocally the user, while the tracing device identification code identifying univocally the tracing device 11 which the user uses to track the product and/or the activity. Moreover the verification server 12 is configured to store all the user identification codes, and all the tracing device identification codes provided by the Web Portal.

Conveniently, the tracing device 11 may be further configured to:

provide the verification server 12 also with the user identification code and the tracing device identification code.

Accordingly, the verification server 12 may be further configured to:

communicate with, and provide the validation code to, only the tracing devices 11 which provides a tracing device identification code and a user identification code which correspond, respectively, to a stored tracing device identification code and to a stored user identification code; and generate the validation code also on the basis of the tracing device identification code and the user identification code provided by the tracing device 11.

Conveniently, the validation code may encapsulate also the tracing device identification code and the user identification code.

More conveniently, the validation code is an alphanumerical code.

Furthermore, the tracing device 11 may be, conveniently, further configured to:

store on the tracking means also a checksum to be used to ensure consistency of the stored traceability data.

More conveniently, the verification server 12 may be further configured to:

compute the checksum; and to provide the tracing device 11 with the computed checksum.

Conveniently, the tracking means may be an electronic label, for example based on RFID technology.

Conveniently, the tracing device 11 may be coupled also with a temperature sensor, and may be further configured to:

acquire a sensed temperature from the temperature sensor, the sensed temperature corresponding to the event which corresponds to, and is associated with, the positioning data, and is related to the product and/or to the activity to be tracked; and include in the event log data the sensed temperature.

Conveniently, the tracing device 11 may be coupled also with a humidity sensor, and may be further configured to:

acquire a sensed humidity from the humidity sensor, the sensed humidity corresponding to the event; and include in the event log data the sensed humidity.

Conveniently, the tracing device 11 may be further configured to:

accept input of user data from the user, the user data corresponding to the event; and include in the event log data the user data.

Conveniently, the user may store the tracing device identification code and the user identification code on the tracing device 11.

Alternatively, the tracing device 11 may be further configured to:

accept input of the tracing device identification code and the user identification code from the user.

For example, the tracing device 11 could be coupled with a touch screen and/or a keyboard used to accept the input from the user of the user data and/or of the identification codes.

Figure 3:
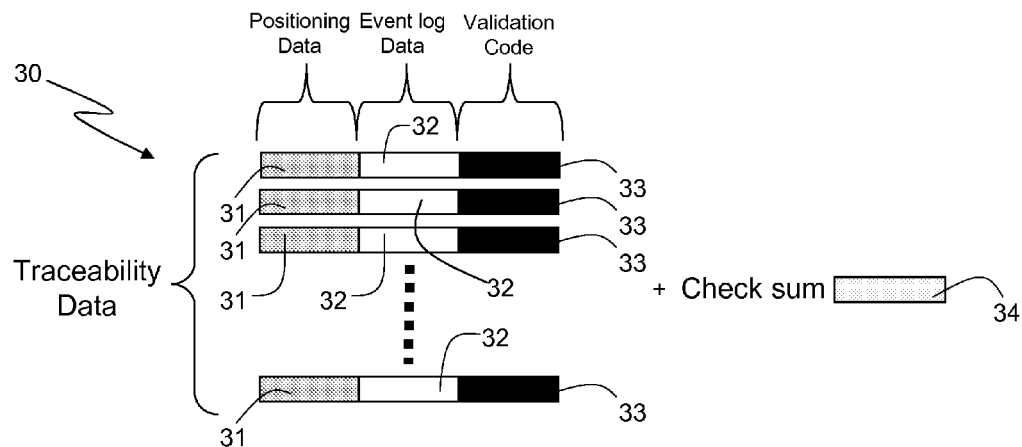
FIG. 3 shows a second example of traceability data according to the present invention.

Furthermore, FIG. 3 shows a second example of traceability data 30 used to track a product and/or an activity, and stored on tracking means, according to the present invention.

In particular, as shown in the FIG. 3, the traceability data 30 comprise a plurality of positioning data 31, event log data 32, and validation codes 33, and are stored on the tracking means together with a checksum 34 to be used to ensure consistency of the traceability data 30.

In detail, the traceability data 30 can be updated by adding new positioning data 31, event log data 32 and validation codes 33 corresponding to new events related to the tracked product and/or to the tracked activity.

When the traceability data 30 are updated, also the checksum 34 is updated.

Furthermore, a mechanism to lock the traceability data 30 may be, conveniently, used to prevent updating of the traceability data 30 when no additional updating are expected or requested. Also the checksum 34 and a final given validation code 33 added to the traceability data 30 may be used for this purpose.

Accordingly, the traceability data 30 may be open or locked.

Conveniently, the traceability data 30 could be locked only by authorized users.

Moreover, the verification server 12, preferably, is coupled with first storing means, such as a database, and is further configured to:

store the generated validation code on the first storing means.

Conveniently, the tracing device 11 may be coupled also with second storing means, such as a database, and may be further configured to:

store the traceability data on the second storing means.

Figure 4:
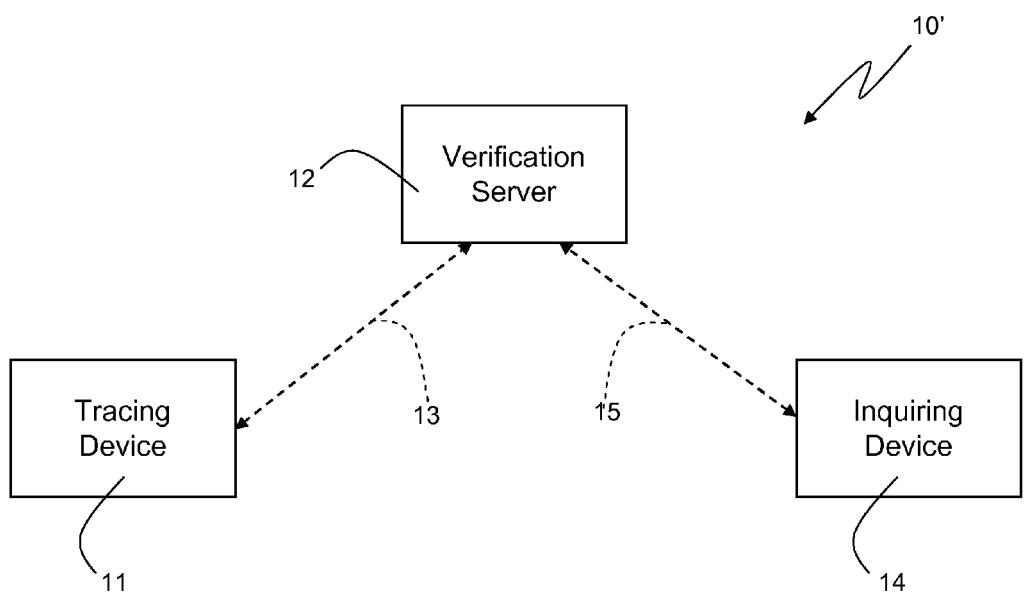
FIG. 4 shows schematically another embodiment of the present invention.

Furthermore, FIG. 4 shows another embodiment of the present invention.

In particular, the FIG. 4 shows schematically a tracking system 10' comprising:

the tracing device 11, as previously described;
the verification server 12, as previously described; and
an inquiring device 14.

In detail, the inquiring device 14 is coupled with the verification server 12 by means of second communication means used to exchange data between the inquiring device 14 and the verification server 12, as shown in the FIG. 4 by a second dotted bi-directional arrow 15, while the dotted bi-directional arrow 13 represents, as in the FIG. 1 and as previously said, the communication means used to exchange data between the tracing device 11 and the verification server 12.

Moreover, the inquiring device 14 is configured to:

retrieve from tracking means traceability data stored thereon, the tracking means being associated with a tracked product and/or a tracked activity, the traceability data stored on the tracking means comprising at least one validation code;
provide a second user with the retrieved traceability data, the second user being using the inquiring device 14; and
provide the verification server 12 with the at least one validation code comprised in the retrieved traceability data.

Accordingly, the verification server 12 is further configured to:

perform a validation code check based on the at least one validation code provided by the inquiring device 14, and on at least one validation code stored on the first storing means; and
provide the inquiring device 14 with a validation code check result which is an outcome of the validation code check.

Furthermore, the inquiring device 14 is, in turn, further configured to:

provide the second user also with the validation code check result provided by the verification server 12.

For example, the inquiring device 14 may be, conveniently, coupled with a display used to provide the second user with the retrieved traceability data and the validation code check result provided by the verification server 12.

Preferably, the verification server is configured to perform the validation code check by checking whether the at least one validation code provided by the inquiring device 14 corresponds to a validation code stored on the first storing means, and whether the at least one validation code provided by the inquiring device 14 is consistent with, i.e., is equal to, the corresponding validation code stored on the first storing means Conveniently, in order to avoid fraud and falsifications, the inquiring device 14 may be used by enforcers and final users to read the traceability data stored on the tracking means, and to check if the traceability data are validated or not.

Conveniently, the tracing device 11 and the inquiring device 14 may be realized by means of respective electronic devices comprising respective hardware means and respective software means, the respective hardware means and the respective software means being configured to implement features of the tracing device 11 or of the inquiring device 14 as previously described.

Moreover, the verification server 12 may be implemented on the same electronic device of the tracing device 11 by means of respective software and hardware means. In this case, the validation server is used as a "black box" by the user which uses the tracing device 11. The "black box" mode of the validation server 12 does not allow the user, subject to tracking control, to have visibility and to know the secret encryption and validation keys and related processing algorithms performed by the verification server 12. This secret data set is defined and known only by the authority in charge to perform the control and assumed to be proprietary of the validation server 12 "black box". The authority in charge to control may decide to sub-license the validation server 12 to a body under the condition of absence of conflict of interest with the company subject to tracking control.

Alternatively, the verification server 12 may be realized by means of an electronic processor, and by means of a software program stored on, and, in use, run by the electronic processor, the electronic processor and the software program being configured to implement features of the verification server 12 as previously described. In this case the verification server 12 may be remotely connected to the tracing device 11 by means of a wired and/or wireless communication network (which is the communication means used to exchange data between the tracing device 11 and the verification server 12).

Moreover, conveniently, also the second communication means may be a wired and/or wireless communication network.

Figure 5:
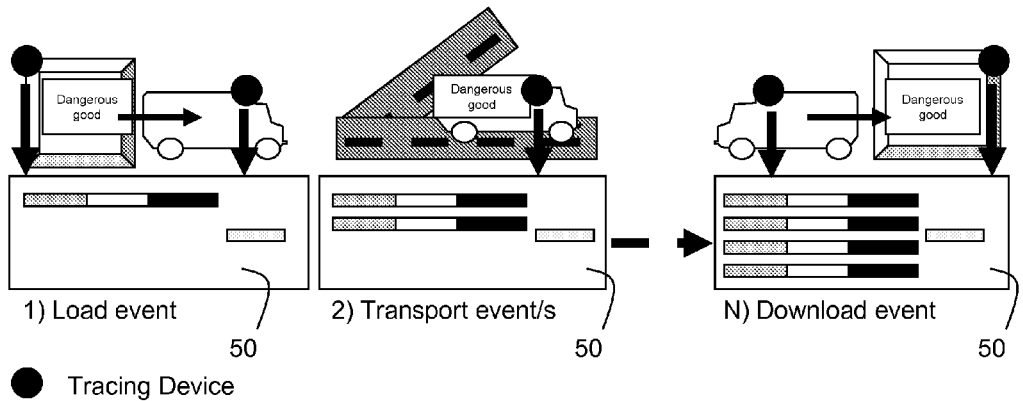
FIG. 5 shows an example of use of the present invention.

Moreover, FIG. 5 shows in a self-explanatory way an example of use of the present invention.

In particular, in the example shown in the FIG. 5 the tracking system according to the present invention is used to track dangerous goods to be transported.

In detail, as shown in the FIG. 5, tracking means 50 are associated with the dangerous goods to be tracked, and traceability data and a checksum are stored/updated on the tracking means 50 by means of several tracing devices according to the present invention. The traceability data and the checksum are stored/updated on the tracking means 50 when the dangerous goods are loaded on a truck, whenever it is necessary during dangerous goods transportation, and when the dangerous goods are downloaded from the truck at their final destination.

The traceability data and the checksum are also stored/updated on the tracking means 50 according to alarms and events triggered by predefined thresholds associated to various sensors used for the specific tracking case (e.g. the traceability data are stored/updated on the basis of a trigger activated when the temperature, monitored by a dedicated sensor, raises a predefined threshold).

Furthermore, the teachings of present invention can be exploited to realize a value chain involving several actors, the value chain being based on traceability assured by the traceability data and by the tracking system according to the present invention, the value chain being applicable to all those fields wherein a reliable tracking of a product and/or of an activity represents a mandatory and/or valuable requirement for the product and/or the activity and also for the involved actors.

Figure 6:
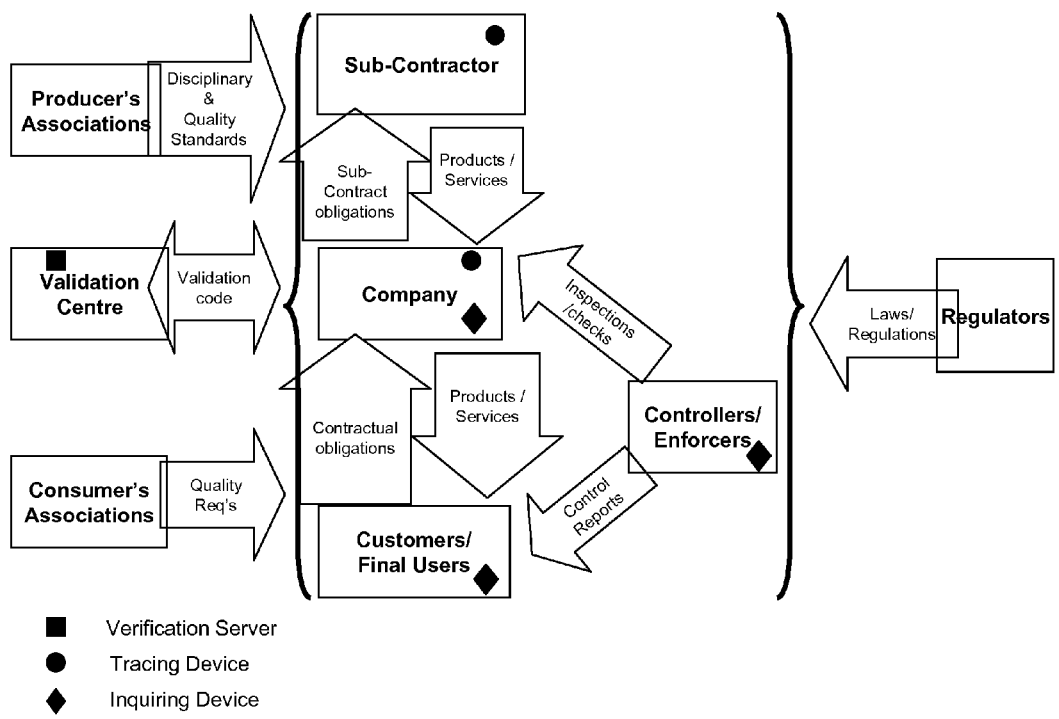
FIG. 6 shows main actors involved in a value chain based on the present invention.

In particular, FIG. 6 shows in a self-explanatory way main actors involved in a value chain based on the present invention.

In detail, in the FIG. 6 each rectangular box represents a corresponding main actor involved in the value chain, each arrow and its respective direction represent a relation existing between two respective main actors, a black square represent a verification server according to the present invention used by one of the main actors, in particular a Validation Centre, each black circle represents a respective tracing device according to the present invention used by a respective main actor, and each black rhombus represents a respective inquiring device according to the present invention used by a respective main actor.

More in detail, as shown in the FIG. 6, the main actors involved in the value chain based on the present invention are:
a Company which performs a work, for example produces a product or delivers a service, and uses one or more tracing devices and inquiring devices according to the present invention to track the performed work, since traceability represents for the Company an essential evidence of compliance with laws, regulations and contractual obligations towards Customers/Final Users and Controllers/Enforcers;
the Customers/Final Users which buy the product or the service from the Company, generally according to a contract defining obligations, and which use inquiring devices according to the present invention to have an evidence of quality and compliance of the bought product/service with contractual obligations and with laws and regulations;
the Controllers/Enforcers which use inquiring devices according to the present invention to perform routine and ad-hoc inspections on the work performed by the Company in order to verify the compliance with applicable laws/regulations dictated by Regulators;
a Sub-Contractor which has a sub-contract with the Company, performs a specific task of the work, and uses one or more tracing devices according to the present invention to track the performed task and to provide evidence of quality to the Company assigning the contract;
Consumer's Associations which defend interests of consumers issuing quality requirements and promoting reliable quality checks based on tracking according to the present invention for verification of the quality requirements;
Producer's Associations which defend the interests of the companies on a specific market sector by defining quality standards, specific disciplinary for the production procedures, and other rules with the aim to "sell" a common quality flag;
The Regulators which are in charge to define the applicable laws and regulations at international, national, and regional level, rules and regulations defined by the Regulators including appropriate controls and enforcement required to ensure their application; and
the Validation Centre which uses the verification server to provide an added value service to all the previously mentioned main actors.

Therefore, main advantages introduced in the value chain by the present invention relate to:
the Company which can use the several tracing devices to automatically generate independent and objectives evidences for the Controllers/Enforcers and the Customers/Final Users with a considerable cost saving, and the several inquiring devices to check the task performed by the Sub-Contractor, this quality mechanism introduced by the present invention being also able to protect the Company against illegal competitors which do not respect the laws/regulations or the contractual obligations;
the Controllers/Enforcers which using the inquiring devices may reduce the effort required for the routine verifications in order to exploit all resources for the ad-hoc verifications; and
the Customers/Final Users which have obviously big advantages from the use of the present invention in the value chain since the traceability evidences, associated to the guarantee of product/activity quality, are not generated by the Companies themselves avoiding a potential conflict of interest.

From the foregoing, it may be immediately appreciated that the present invention assures the reliability of the positioning data used to track a product and/or an activity by checking and verifying their correctness and their genuineness.

Moreover, according to the present invention a simple, automatic, and quick response during the verification is provided.

Furthermore, the present invention introduces an innovative mechanism for the traceability of events related to locations and time which is able to discriminate genuine positioning data from corrupted and/or manipulated positioning data, such as those obtained by GNSS signal jamming and spoofing attacks. This mechanism is also able to identify false positioning data obtained by cloning genuine positioning data, such as those obtained by simply copying and pasting genuine positioning data.

In particular, the use of the GNSS observables allows to discriminate, in general, if the computed location is correct, and, in particular, if the computed location is consistent with GNSS observables based on which it has been computed.

The use of the Galileo signal authentication data allows to reinforce the robustness against frauds, such as those based on Galileo signal spoofing attacks, since the Galileo signal authentication data, available as encrypted data part of the Galileo signal, are used as an evidence that the input signals, based on which the location has been computed, are actually those generated by the Galileo Navigation System, and that the location time is the true one.

Also the use of the Galileo and/or SBAS Integrity messages allows to check genuineness of the input signals and consistency of the location time, since the Galileo/SBAS Integrity messages are transmitted every second with the Safety of Life service signal, and have respective time periods of validity, thence, represent a unique, and non-replicable sequence of data useful to discriminate the actual time of Galileo/SBAS signal reception.

Moreover, the use of the SBAS augmentation data allows to discriminate if the computed location and the location time are correct.

Furthermore, the use of validation codes having a readable part and an encrypted part allows authorised users knowing the decryption key to check the consistency between readable and encrypted data, thus further reinforcing the robustness of the present invention against frauds.

Moreover, it can be useful to underline that the present invention allows to obtain a very reliable tracking based only on satellite localization without any need of further data sources, such as a weather satellite system.

Finally, it is clear that numerous modifications and variants can be made to the present invention, all falling within the scope of the invention, as defined in the appended claims.

The invention claimed is:
1. A tracking system configured to track a product and/or an activity, the tracking system comprising:
a tracing device and a verification server, the tracing device being coupled with the verification server by means of communication means configured to allow exchange of data between the tracing device and the verification server;

the tracing device being coupled with a first satellite localization receiver to acquire data therefrom;

the first satellite localization receiver being configured to:

receive signals from a satellite localization system;

process the received signals to obtain satellite localization observables; and compute locations based on the satellite localization observables;

the tracing device being configured to:

acquire positioning data from the first satellite localization receiver, the positioning data comprising a location computed by the first satellite localization receiver, and a location time which represents time and data at which the location is computed by the first satellite localization receiver, the positioning data being related to the product and/or the activity to be tracked;

select a satellite localization observable based on which the location is computed by the first satellite localization receiver;

acquire from the first satellite localization receiver the selected satellite localization observable; and provide the verification server with the positioning data and the satellite localization observable acquired from the first satellite localization receiver;

the verification server being configured to:

perform a location consistency check based on the location comprised in the positioning data provided by the tracing device, and on the satellite localization observable provided by the tracing device;

generate a validation code on the basis of an outcome of the location consistency check, and on the basis of the positioning data provided by the tracing device; and provide the tracing device with the generated validation code;

the tracing device being further configured to:

store the positioning data, and the validation code provided by the verification server on tracking means associated with the product and/or the activity to be tracked.

2. The system according to claim 1, wherein the verification server is further configured to:

generate instructions based on the positioning data provided by the tracing device; and provide the tracing device with the generated instructions;

the tracing device being further configured to:

select the satellite localization observable to be acquired from the first satellite localization receiver according to the instructions provided by the validation server.

3. The system according to claim 1, wherein the validation code generated by the verification server comprises a first part and a second part, the first part being readable, the second part being encrypted with an encryption key known only by the verification server.

4. The system according to claim 1, wherein the verification server is configured to perform the location consistency check by checking whether the location comprised in the positioning data provided by the tracing device is consistent with the satellite localization observable provided by the tracing device.

5. The system according to claim 1, wherein the satellite localization system is a Galileo Navigation System, and wherein the tracing device is further configured to:

acquire from the first satellite localization receiver encrypted Galileo signal authentication data which are received by the first satellite localization receiver from the Galileo Navigation System, and are current at the location time; and provide the verification server also with the encrypted Galileo signal authentication data acquired from the first satellite localization receiver;

the verification server being further configured to:

acquire a Galileo key from a key distribution facility of the Galileo Navigation System;

perform a first Galileo signal authenticity check based on the encrypted Galileo signal authentication data provided by the tracing device, and on the acquired Galileo key; and generate the validation code also on the basis of an outcome of the first Galileo signal authenticity check.

6. The system according to claim 5, wherein the verification server is configured to perform the first Galileo signal authenticity check by checking whether the encrypted Galileo signal authentication data provided by the tracing device are decryptable using the Galileo key.

7. The system according to claim 1, wherein the satellite localization system is a Galileo Navigation System, and wherein the tracing device is further configured to:

acquire from the first satellite localization receiver encrypted Galileo signal authentication data which are received by the first satellite localization receiver from the Galileo Navigation System, and are current at the location time; and provide the verification server also with the encrypted Galileo signal authentication data acquired from the first satellite localization receiver; the verification server being coupled with a second satellite localization receiver to acquire data therefrom, the second satellite localization receiver being configured to receive, and to process the signals from the Galileo Navigation System;

the verification server being further configured to:

acquire from the second satellite localization receiver encrypted Galileo signal authentication data received by the second satellite localization receiver from the Galileo Navigation System;

store the encrypted Galileo signal authentication data acquired from the second satellite localization receiver;

perform a second Galileo signal authenticity check based on the encrypted Galileo signal authentication data provided by the tracing device, on the location time comprised in the positioning data provided by the tracing device, and on at least one of the stored encrypted Galileo signal authentication data; and generate the validation code also on the basis of an outcome of the second Galileo signal authenticity check.

8. The system according to claim 7, wherein the verification server is configured to perform the second Galileo signal authenticity check by checking whether the encrypted Galileo signal authentication data provided by the tracing device are consistent with stored encrypted Galileo signal authentication data which are current at the location time comprised in the positioning data provided by the tracing device.

9. The system according to claim 1, wherein the satellite localization system is a Galileo Navigation System, and wherein the tracing device is further configured to:

acquire from the first satellite localization receiver a Galileo Integrity message which is received by the first satellite localization receiver from the Galileo Navigation System, and is valid at the location time; and provide the verification server also with the Galileo Integrity message acquired from the first satellite localization receiver;

the verification server being coupled with a second satellite localization receiver to acquire data therefrom, the second satellite localization receiver being configured to receive, and to process the signals from the Galileo Navigation System; the verification server being further configured to:
acquire from the second satellite localization receiver Galileo Integrity messages received by the second satellite localization receiver from the Galileo Navigation System;
store the Galileo Integrity messages acquired from the second satellite localization receiver;
perform a third Galileo signal authenticity check based on the Galileo Integrity message provided by the tracing device, on the location time comprised in the positioning data provided by the tracing device, and on at least one of the stored Galileo Integrity messages; and
generate the validation code also on the basis of an outcome of the third Galileo signal authenticity check.

10. The system according to claim 9, wherein the verification server is configured to perform the third Galileo signal authenticity check by checking whether the Galileo Integrity message provided by the tracing device is consistent with a stored Galileo Integrity message which is valid at the location time comprised in the positioning data provided by the tracing device.

11. The system according to claim 1, wherein the first satellite localization receiver is further configured to:
receive signals also from a Satellite Based Augmentation System (SBAS);
process the received signals to obtain augmentation data; and
compute the location also based on the augmentation data;
the tracing device being further configured to:
acquire from the first satellite localization receiver a SBAS Integrity message which is received by the first satellite localization receiver from the Satellite Based Augmentation System (SBAS), and is valid at the location time; and
provide the verification server also with the SBAS integrity message acquired from the first satellite localization receiver;
the verification server being coupled with a second satellite localization receiver to acquire data therefrom, the second satellite localization receiver being configured to receive, and to process the signals from the Satellite Based Augmentation System (SBAS); the verification server being further configured to:
acquire from the second satellite localization receiver SBAS Integrity messages received by the second satellite localization receiver from the Satellite Based Augmentation System (SBAS);
store the SBAS Integrity messages acquired from the second satellite localization receiver;
perform a SBAS signal authenticity check based on the SBAS Integrity message provided by the tracing device, on the location time comprised in the positioning data provided by the tracing device, and on at least one of the stored SBAS Integrity messages; and
generate the validation code also on the basis of an outcome of the SBAS signal authenticity check.

12. The system according to claim 11, wherein the verification server is configured to perform the SBAS signal authenticity check by checking whether the SBAS Integrity message provided by the tracing device is consistent with a stored SBAS Integrity message which is valid at the location time comprised in the positioning data provided by the tracing device.

13. The system according to claim 1, wherein the first satellite localization receiver is configured to:
receive signals also from a Satellite Based Augmentation System (SBAS);
process the received signals to obtain augmentation data; and
compute the location also based on the augmentation data;
the tracing device being further configured to:
acquire from the first satellite localization receiver SBAS augmentation data based on which the location is computed; and
provide the verification server also with the SBAS augmentation data acquired from the first satellite localization receiver;
the verification server being coupled with a second satellite localization receiver to acquire data therefrom, the second satellite localization receiver being configured to receive, and to process the signals transmitted by the Satellite Based Augmentation System (SBAS); the verification server being further configured to:
acquire from the second satellite localization receiver SBAS augmentation data received by the second satellite localization receiver from the Satellite Based Augmentation System (SBAS);
store the SBAS augmentation data acquired from the second satellite localization receiver;
perform a multiple check based on the SBAS augmentation data provided by the tracing device, on the positioning data provided by the tracing server, and on at least one of the stored SBAS augmentation data; and
generate the validation code also on the basis of an outcome of the multiple check.

14. The system according to claim 13, wherein the verification server is configured to perform the multiple check by checking whether the SBAS augmentation data provided by the tracing device are consistent with stored SBAS augmentation data which are valid at the location time comprised in the positioning data provided by the tracing device, and whether the location comprised in the positioning data provided by the tracing device is consistent with stored SBAS augmentation data which are valid at the location time comprised in the positioning data provided by the tracing device.

15. The system according to claim 1, wherein the tracing device is further configured to:
generate event log data comprising information about an event which corresponds to the positioning data, and is related to the product and/or the activity to be tracked; and
provide the verification server also with the event log data;
the verification server being further configured to:
generate the validation code also on the basis of the event log data provided by the tracing device.

16. The system according to claim 15, wherein the tracing device is further configured to:
detect traceability data stored on the tracking means;
if the traceability data stored on the tracking means are detected, update the traceability data stored on the tracking means by adding to the traceability data stored on the tracking means the positioning data, the event log data, and the validation code provided by the verification server; and
if the traceability data stored on the tracking means are not detected, generate traceability data and store the generated traceability data on the tracking means, the generated traceability data comprising the positioning data, the event log data, and the validation code provided by the verification server.

17. The system according to claim 1, wherein the tracing device is further configured to:

provide the verification server also with a first identification code which identifies univocally the tracing device, and with a second identification code which identifies univocally a user of the tracing device;

the verification server being further configured to:

generate the validation code also on the basis of the first and second identification code provided by the tracing device.

18. The system according to claim 17, wherein the verification server comprises a Web portal which is configured to register the user and the tracing device, and to provide the user with the first and second identification code.

19. The system according to claim 1, wherein the verification server is coupled with storing means, and is further configured to:

store the generated validation code on the storing means.

20. The system according to claim 19, further comprising an inquiring device which is coupled with the verification server by means of second communication means configured to allow exchange of data between the inquiring device and the verification server; the inquiring device being configured to:

retrieve from tracking means traceability data stored thereon, the tracking means being associated with the tracked product and/or the tracked activity, the traceability data stored on the tracking means comprising at least one validation code;

provide a second user with the acquired traceability data, the second user being using the inquiring device; and provide the verification server with the at least one validation code comprised in the acquired traceability data;

the verification server being further configured to:

perform a validation code check based on the at least one validation code provided by the inquiring device, and on at least one validation code stored on the storing means; and provide the inquiring device with a validation code check result which is an outcome of the validation code check;

the inquiring device being further configured to:

provide the second user also with the validation code check result provided by the verification server.

21. The system according to claim 20, wherein the verification server is configured to perform the validation code check by checking whether the at least one validation code provided by the inquiring device corresponds to a validation code stored on the storing means, and whether the at least one validation code provided by the inquiring device is consistent with the corresponding validation code stored on the storing means.

22. A tracking system configured to track a product and/or an activity, the tracking system comprising:

a tracing device configured to be coupled with a verification server by means of communication means configured to allow exchange of data between the tracing device and the verification server, wherein the tracing device is configured to:

acquire positioning data from a first satellite localization receiver, the positioning data comprising a location computed by the first satellite localization receiver, and a location time which represents time and data at which the location is computed by the first satellite localization receiver, the positioning data being related to the product and/or the activity to be tracked, select a satellite localization observable based on which the location is computed by the first satellite localization receiver, acquire from the first satellite localization receiver the selected satellite localization observable, provide the verification server with the positioning data and the satellite localization observable acquired from the first satellite localization receiver, and store the positioning data, and a validation code provided by the verification server on tracking means associated with the product and/or the activity to be tracked.

23. A tracking system configured to track a product and/or an activity, the tracking system comprising:

a verification server configured to be coupled with a tracing device by means of communication means configured to allow exchange of data between the verification server and the tracing device, wherein the verification server is configured to:

receive positioning data from the tracing device, the positioning data comprising a location computed by a first satellite localization receiver, and a location time which represents time and data at which the location is computed by the first satellite localization receiver, the positioning data being related to the product and/or the activity to be tracked, receive a satellite localization observable acquired from the first satellite localization receiver provided by the tracing device, perform a location consistency check based on the location comprised in the positioning data provided by the tracing device, and on the satellite localization observable provided by the tracing device, generate a validation code on the basis of an outcome of the location consistency check, and on the basis of the positioning data provided by the tracing device, and provide the tracing device with the generated validation code.

24. A non-transitory computer readable medium storing instructions, wherein execution of the instructions by a processing device causes the processing device to implement a method comprising:

receiving positioning data from a tracing device, the positioning data comprising a location computed by a first satellite localization receiver, and a location time which represents time and data at which the location is computed by a first localization receiver, the positioning data being related to a product and/or an activity to be tracked, receiving a satellite localization observable acquired from the first satellite localization receiver provided by the tracing device, performing, via the processing device, a location consistency check based on the location comprised in the positioned data provided by the tracing device, and on the satellite localization observable provided by the tracing device, generating, via the processing device, a validation code on the basis of an outcome of the location consistency check, and on the basis of the positioning data provided by the tracing device, and providing the tracing device with the generated validation code.

25. A tracking system configured to track a product and/or an activity, the tracking system comprising:

an inquiring device configured to be coupled with a verification server by means of communication means configured to allow exchange of data between the inquiring device and the verification server, wherein the inquiring device is configured to:

retrieve from tracking means traceability data stored thereon, the tracking means being associated with the tracked product and/or the tracked activity, the traceability data stored on the tracking means comprising at least one validation code, provide a user with the acquired traceability data, the user being using the inquiring device, provide the verification server with the at least one validation code comprised in the acquired traceability data, and provide the user with a validation code check result which is an outcome of a validation code check provided by the verification server.

* * * * *